US012770860B2

(12) United States Patent
Jung et al.

(10) Patent No.: US 12,770,860 B2
(45) Date of Patent: Oct. 20, 2026

(54) CATHODE ACTIVE MATERIAL, AND LITHIUM ION BATTERY COMPRISING SAID CATHODE ACTIVE MATERIAL

(71) Applicant: Bayerische Motoren Werke Aktiengesellschaft, Munich (DE)

(72) Inventors: Roland Jung, Munich (DE); Thomas Woehrle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 614 days.

(21) Appl. No.: 17/928,035

(22) PCT Filed: Jul. 7, 2021

(86) PCT No.: PCT/EP2021/068768

§ 371 (c)(1),
(2) Date: Nov. 28, 2022

(87) PCT Pub. No.: WO2022/022958

PCT Pub. Date: Feb. 3, 2022

(65) Prior Publication Data

US 2023/0216031 A1 Jul. 6, 2023

(30) Foreign Application Priority Data

Jul. 28, 2020 (DE) ..................... 10 2020 119 843.4

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/505* (2013.01); *H01M 4/525* (2013.01);
(Continued)

(58) Field of Classification Search
CPC ...... H01M 4/366; H01M 4/131; H01M 4/505; H01M 4/525; H01M 10/0525; H01M 2004/021; H01M 2004/028; Y02E 60/10
See application file for complete search history.

(56) References Cited

U.S. PATENT DOCUMENTS 4,507,371 A 3/1985 Thackeray et al.
9,040,199 B2 5/2015 Kinoshita et al.
(Continued)

FOREIGN PATENT DOCUMENTS

CN 101399370 A 4/2009
CN 105895856 * 8/2016
(Continued)

OTHER PUBLICATIONS

International Search Report (PCT/ISA/210) issued in PCT Application No. PCT/EP2021/068768 dated Sep. 23, 2021 with English translation (five (5) pages).
(Continued)

*Primary Examiner* — Lisa S Park
(74) *Attorney, Agent, or Firm* — Crowell & Moring LLP

(57) ABSTRACT

A cathode active material for a lithium ion battery includes particles having a core-shell structure, where each of the particles has a core including a core material and a shell including a shell material. The core material is selected from the group consisting of: layered oxides, including overlithiated layered oxides, compounds having an olivine structure, compounds having a spinel structure, and combinations thereof. The shell material includes a spinel compound. The shell material and/or the core material is at least partially delithiated.

12 Claims, 1 Drawing Sheet

(51) Int. Cl.

| | |
|---|---|
| ***H01M 4/505*** | (2010.01) |
| ***H01M 4/525*** | (2010.01) |
| ***H01M 10/0525*** | (2010.01) |
| *H01M 4/02* | (2006.01) |

(52) U.S. Cl.

CPC .. *H01M 10/0525* (2013.01); *H01M 2004/021* (2013.01); *H01M 2004/028* (2013.01)

(56) References Cited

U.S. PATENT DOCUMENTS

| | | | | |
|---|---|---|---|---|
| 2009/0081534 | A1* | 3/2009 | Takami | H01M 4/131 429/231.1 |
| 2010/0203388 | A1* | 8/2010 | Kim | H01M 4/5825 429/231.95 |
| 2014/0199475 | A1* | 7/2014 | Tonegawa | H01M 4/0471 427/122 |
| 2014/0342226 | A1* | 11/2014 | Sasaki | H01M 4/13 252/182.1 |
| 2017/0018760 | A1 | 1/2017 | Lupart et al. | |
| 2018/0006302 | A1* | 1/2018 | Li | H01M 4/0471 |
| 2018/0316009 | A1* | 11/2018 | Park | H01M 4/525 |

FOREIGN PATENT DOCUMENTS

| | | | |
|---|---|---|---|
| CN | 105938917 | A | 9/2016 |
| DE | 33 19 939 | A1 | 12/1983 |
| DE | 10 2014 205 945 | A1 | 10/2015 |
| EP | 0 017 400 | A1 | 10/1980 |

OTHER PUBLICATIONS

German-language Written Opinion (PCT/ISA/237) issued in PCT Application No. PCT/EP2021/068768 dated Sep. 23, 2021 (five (5) pages).

German-language Search Report issued in German Application No. 10 2020 119 843.4 dated Apr. 9, 2021 with partial English translation (10 pages).

S. Venkat et al. "Existence of Path-Dependence in the $LiFePO_4$ Electrode," Electrochemical and Solid-State Letters, vol. 9, No. 3, pp. A110-A114; DOI: 10.1149/1.2159299 ISSN: 1099-0062, XP055841166 dated Jan. 1, 2006 (six (6) pages).

D. A. Cogswell et al. "Size-dependent phase morphologies in $LiFePO_4$ battery particles," arxiv.org, Cornell University Library, 201 Olin Library, Cornell University, Ithaca, NY 14853, XP081258347, dated Aug. 19, 2018 (six (6) pages).

Chinese-language Office Action issued in Chinese Application No. 202180038696.5 dated May 28, 2026 with English translation (25 pages).

* cited by examiner

CATHODE ACTIVE MATERIAL, AND LITHIUM ION BATTERY COMPRISING SAID CATHODE ACTIVE MATERIAL

BACKGROUND AND SUMMARY

The invention relates to an active cathode material for a lithium ion battery and to a lithium ion battery having such an active cathode material.

The term "lithium ion battery" is used synonymously hereinafter for all designations that are customary in the art for lithium-containing galvanic elements and cells, for example lithium battery cell, lithium battery, lithium ion battery cell, lithium cell, lithium ion cell, lithium-polymer cell, lithium-polymer battery and lithium ion accumulator. In particular, rechargeable batteries (secondary batteries) are included. The terms "battery" and "electrochemical cell" are also used synonymously with the term "lithium ion battery" and "lithium ion battery cell." The lithium ion battery may also be a solid-state battery, for example a ceramic or polymer-based solid-state battery.

A lithium ion battery has at least two different electrodes: a positive electrode (cathode) and a negative electrode (anode). Each of these electrodes includes at least one active material, optionally together with additions such as electrode binders and electrical conductivity additives.

Suitable active cathode materials are known from EP 0 017 400 B1 and DE 3319939 A1. Document DE 10 2014 205 945 A1 describes an active cathode material comprising particles in which a core of lithium-transition metal oxide is provided with a coating, wherein the coating consists of a solid lithium ion conductor with garnet-like crystal structure and has been deposited by a physical method onto the lithium-transition metal oxide.

In lithium ion batteries, both the active cathode material and the active anode material must be capable of reversibly absorbing and releasing lithium ions. According to prior art, lithium ion batteries are generally assembled and finished in the fully uncharged state. This corresponds to a state in which the lithium ions are fully intercalated in the cathode, while the anode typically does not have any active, i.e., reversibly cyclable, lithium ions.

In the first charging operation of the lithium ion battery, which is known by the term "formation," the lithium ions leave the cathode and are intercalated in the anode. This first charging operation includes complex processes having a multitude of reactions that proceed between the various components of the lithium ion batteries.

Of particular significance here is the formation of an interface between active material and electrolyte on the anode, which is also referred to as "solid electrolyte interface" or "SEI." The formation of the SEI, which can also be regarded as a protective layer, is attributed essentially to break down reactions of the electrolyte (dissolved conducted lithium salt in organic solvents) with the surface of the active anode material.

However, the formation of the SEI requires lithium, which is no longer available later on for cycling in the charging and discharging process. The difference in capacity after the first charge and the capacity after the first discharge, relative to the charging capacity, is referred to as formation loss and, depending on the active cathode and anode materials used, may be in the range from about 5% to 40%.

In a lithium ion battery with a cathode based on the layered oxide lithium nickel manganese cobalt oxide (NMC) and an anode based on graphite, formation losses may be about 6%-20%. Accordingly, the nominal capacity of lithium ion battery is reduced. Formation losses in the case of use of a layered oxide cathode (e.g., NMC) arise not only from the losses on account of SEI formation on the anode but also because, in the discharging of the lithium ion battery, not all reversibly cyclable lithium ions from the lithium-laden anode can be intercalated into the NMC at standard current rates.

One object of the disclosure is that of providing an active cathode material for a lithium ion battery, which is capable of reducing the formation losses of the lithium ion battery, such that the lithium ion battery is notable especially for elevated specific energy and energy density.

This object may be achieved by an active cathode material according to the independent claim. Advantageous configurations and developments of the technology are the subject of the dependent claims.

In one embodiment of the invention, the active cathode material comprises particles having a core-shell structure. The particles each have a core, wherein the material of the core ("core material") is selected from the group consisting of layered oxides, including overlithiated layered oxides (OLOs), compounds having olivine structure, compounds having spinel structure and combinations thereof. In addition, the particles each have a shell. The material of the shell ("shell material") may especially be applied to the core of the particles by a coating method. Coating methods suitable for this purpose are known from document DE 10 2014 205 945 A1 that was cited in the introduction.

In one embodiment of the invention, the material of the shell includes an olivine compound. Preferably, the material of the shell is at least partly delithiated. Alternatively or additionally, the material of the core is at least partly delithiated. In other words, the material of the shell and/or the material of the core has a lithiation level $x<1$. The term "lithiation level" or "degree of lithiation" here and hereinafter refers to the content of reversibly cyclable lithium, in the form of lithium ions and/or metallic lithium, relative to the maximum content of reversibly cyclable lithium in the active material. In other words, the lithiation level is a measure of the proportion of the maximum cyclable lithium content that is intercalated within the structure of the active material. A lithiation level of 1 denotes a fully lithiated active material, whereas a lithiation level of 0 indicates a fully delithiated active material. For example, in a stoichiometric olivine $LiFePO_4$, the lithiation level is $x=1$, and in the case of pure $FePO_4$, correspondingly, $x=0$.

The lithium ions, after filling with electrolyte and especially in the first charging and discharging operation, depending on the respective voltage window of the material of the core and of the shell, may not be intercalated uniformly into the materials of the core and of the shell. Accordingly, the lithiation levels of the materials of the core and of the shell may be different than the original state in the active cathode material after the filling of the lithium ion battery with electrolyte and/or after the first discharging and/or charging operation. Therefore, the figures relating to the lithiation levels in the active cathode material of the disclosure relate to the state before the first charging and discharging operation and especially before the filling of the lithium ion battery with electrolyte.

The material of the core may include a layered oxide, for example, lithium nickel manganese cobalt oxide (NMC), lithium nickel cobalt aluminum oxide (NMA) or lithium cobalt oxide (LCO). The layered oxide may especially be an overlithiated layered oxide (OLO). Alternatively, the material of the core may include a compound having spinel structure, for example lithium manganese oxide (LMO) or lithium nickel manganese oxide (LNMO), or a compound having olivine structure, for example lithium iron phosphate (LFP; $LiFePO_4$) or lithium (manganese or cobalt) iron phosphate (LMFP, M=e.g., Mn or Co).

For formation of a shell, the core of the active cathode material is surface-coated with preferably an at least partly delithiated olivine compound. In principle, any desired olivine compound may be suitable. The olivine compound is preferably an exclusively iron- and/or manganese-containing olivine (e.g., $FePO_4$, $Fe_{0.5}Mn_{0.5}PO_4$). In the active cathode material, the material of the core and/or the material of the shell of the particles is at least partly delithiated. In particular, an equilibrium of lithium ions may be established between the two active materials of the core and of the shell, since these are directly contacted with one another as lithium ion conductors (direct contact between core and shell).

The active cathode material having the core-shell structure may be processed by conventional electrode production processes to give a positive composite electrode comprising, for example, the active cathode material, an electrode binder and an electrical conductivity additive, for example, conductive carbon black.

The technology is based more particularly on the following considerations: it has been found that, surprisingly, the material of the shell of the proposed active cathode material adheres stably to the material of the core even in the case of mixing at high shear forces and in the case of calendering at high pressures. A further positive effect of the coating of the material of the core with the shell of an olivine compound is that the active cathode material is stabilized in this way, such that it can be processed in an aqueous process to produce a cathode. In such an aqueous process, it is possible to use, for example, demineralized water (DM water) and aqueous electrode binders such as SBR (styrene-butadiene rubber) and/or CMC (carboxymethylcellulose). This especially enables replacement of the organic carrier solvent N-methyl-2-pyrrolidone (NMP), which is costly and toxic. The active cathode material thus enables environmentally friendly and sustainable production of the cathode. Olivines are stable in the aqueous medium. For example, LFP can be processed under aqueous conditions. This is not possible for reasons of stability in the case of conventional active cathode materials such as nickel-rich layered oxides (e.g., $LiNi_{0.8}Mn_{0.1}Co_{0.1}O_2$ (NMC811), lithium nickel cobalt aluminum oxide (NCA)) or lithium-manganese spinel.

The partly or fully delithiated shell of an olivine compound and/or the at least partly delithiated core serve to accept lithium ions that cannot be intercalated into the core at standard current rates and temperatures. As a result, formation losses are reduced, such that the lithium ion battery has elevated specific energy and energy density. This is advantageously achieved without increasing the use of nickel and/or cobalt, which are costly and available in finite volumes. The compound having the olivine structure in the shell of the particles is more chemically and electric chemically stable toward the electrolyte than, for example, layered oxides such as NMC or NCA. This leads to lower gassing over the lifetime or in the event of overcharging. The shell of a material having olivine structure means that the active cathode material is intrinsically safer in the delithiated state than, for example, delithiated NMC under electrical, mechanical and/or thermal stress.

In one embodiment, the material of the shell is an iron- and/or manganese-containing olivine. Particularly preferred materials for the shell are $Li_xFePO_4$ or $Li_xFe_yMn_{1-y}PO_4$ with $0 \leq x \leq 1$ and $0 \leq y \leq 1$. In particular, the lithiation level may be x=0. $FePO_4$ has a reversible specific capacity of 170 mAh/g, rapid kinetics and an average discharge voltage of about 3.45 V versus lithium (3.35 V versus graphite) and a stable structure.

In one embodiment, the material of the shell has a lithiation level x with $0 \leq x < 1$. The material of the shell may especially also be fully delithiated (x=0). Preferably $0 \leq x \leq 0.9$, and more preferably $x \leq 0.8$. The lithiation level may, for example, be $0.5 \leq x \leq 0.9$, especially $0.6 \leq x \leq 0.8$. The lower the lithiation level of the material of the shell, the thinner the shell may be made.

In one embodiment, the particles of the active cathode material have a diameter of from 0.1 μm to 40 μm inclusive. The diameter is understood here to mean the total diameter of the particles consisting of the core and the shell. The particles preferably have a diameter of from 1 μm to 20 μm inclusive.

In one embodiment, the shell of the particles has a thickness of from 0.01 μm to 5 μm inclusive. Preferably, the shell of the particles has a thickness of from 0.05 μm to 1 μm inclusive. The thickness of the shell is preferably smaller than the diameter of the core. The diameter of the core may especially be at least twice, at least 5 times, at least 10 times or even at least 20 times as high as the thickness of the shell. The thin shell compared to the core can be applied to the core by a coating method in a comparatively uncomplicated manner.

In one embodiment, the core of the particles is fully delithiated. In this way, it is possible to achieve a high energy density.

In one embodiment of a process for producing a cathode having the above-described cathode material, the cathode is produced with at least one electrode binder and water as carrier solvent. In such an aqueous process, it is possible, for example, to use demineralized water (DM water) and at least one aqueously processible electrode binder such as SBR (styrene-butadiene rubber) and/or CMC (carboxymethylcellulose). The cathode can advantageously be produced in this way without the use of costly and/or toxic solvents; in particular, it is possible to dispense with NMP as solvent.

Additionally proposed is a lithium ion battery having a cathode having the above-described active cathode material. The cathode may be produced, for example, from a coating formulation containing the active cathode material and NMP, N-ethyl-2 pyrrolidone (NEP), triethyl phosphate or water as carrier solvent.

In a preferred execution, the cathode includes an aqueously processible electrode binder. The cathode in this case may advantageously be produced from a coating formulation processible in an aqueous medium. In this case, it is advantageously possible to dispense with toxic and costly solvents in the production of the cathode.

The lithium ion battery may, for example, comprise just a single battery cell or alternatively comprise one or more modules having multiple battery cells, wherein the battery cells may be connected in series and/or in parallel. The lithium ion battery comprises at least one cathode including the active cathode material having the core-shell structure, and an anode including at least one active anode material. In addition, the lithium ion battery may include the further constituents of a lithium ion battery that are known per se, especially current collectors, a separator and an electrolyte.

The lithium ion battery of the disclosure may especially be provided in a motor vehicle or in a portable device. The portable device may especially be a smartphone, an electric tool or power tool, a tablet or a wearable. Alternatively, the lithium ion battery may also be used in a stationary energy storage means.

Further advantages and properties of the technology will be apparent from the description of a working example which follows, in association with the figures.

BRIEF DESCRIPTION OF THE DRAWINGS

The individual figures show, in schematic form.

The constituents shown and the size ratios of the constituents relative to one another should not be considered to be true to scale.

DETAILED DESCRIPTION OF THE DRAWINGS

Figure 1:
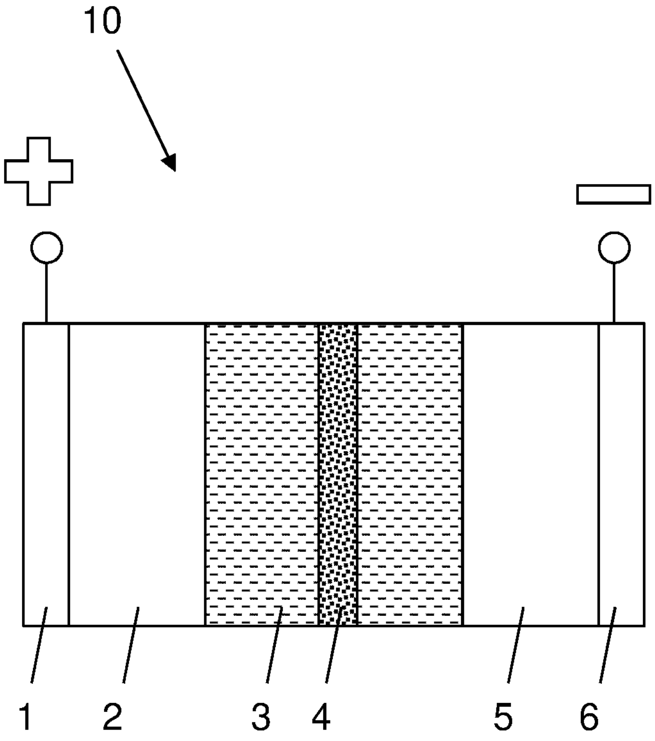
FIG. 1 the construction of a lithium ion battery in one working example, and FIG. 2 a particle of the active cathode material in the working example.

The lithium ion battery 10 shown in purely schematic form in FIG. 1 has a cathode 2 and an anode 5. The cathode 2 and the anode 5 each have a current collector 1, 6, where the current collectors may be executed as metal foils. The current collector 1 of the cathode 2 may include aluminum, for example, and the current collector 6 of the anode 5 may include copper.

The cathode 2 and the anode 5 are separated from one another by a separator 4 which is permeable to lithium ions but impermeable to electrons. Separators used may be polymers, especially a polymer selected from the group consisting of polyesters, especially polyethylene terephthalate, polyolefins, especially polyethylene and/or polypropylene, polyacrylonitriles, polyvinylidene fluoride, polyvinylidene-hexafluoropropylene, polyetherimide, polyimide, aramid, polyether, polyetherketone, synthetic spider silk or mixtures thereof. The separator may optionally additionally be coated with ceramic material and a binder, for example, based on $Al_2O_3$.

In addition, the lithium ion battery includes an electrolyte 3 which is conductive to lithium ions and which may be a solid state electrolyte or a liquid comprising a solvent and at least one conductive lithium salt dissolved therein, for example, lithium hexafluorophosphate ($LiPF_6$). The solvent is preferably inert. Suitable solvents are, for example, organic solvents such as ethylene carbonate, propylene carbonate, butylene carbonate, dimethyl carbonate, diethyl carbonate, ethyl methyl carbonate, fluorethylene carbonate (FEC), sulfolane, 2-methyltetrahydrofuran, acetonitrile and 1,3-dioxolane. Solvents used may also be ionic liquids. Such ionic liquids contain exclusively ions. Preferred cations, which may especially be alkylated, are imidazolium, pyridinium, pyrrolidinium, guanidinium, uronium, thiuronium, piperidinium, morpholinium, sulfonium, ammonium and phosphonium cations. Examples of usable anions are halide, tetrafluoroborate, trifluoroacetate, triflate, hexafluorophosphate, phosphonate and tosylate anions. Illustrative ionic liquids include: N-methyl-N-propyl-piperidinium bis(trifluoromethyl sulfonyl)imide, N-methyl-N-butylpyrrolidinium bis(trifluoromethyl-sulfonyl)imide, N-butyl-N-trimethylammonium bis-(trifluoromethylsulfonyl)imide, triethylsulfonium bis(trifluoromethylsulfonyl)imide and N,N-diethyl-N-methyl-N-(2-methoxyethyl)ammonium bis (trifluoromethyl-sulfonyl)imide. In one variant, it is possible to use two or more of the abovementioned liquids. Preferred conductive salts are lithium salts that have inert anions and are preferably nontoxic. Suitable lithium salts are especially lithium hexafluorophosphate ($LiPF_6$), lithium tetrafluoroborate ($LiBF_4$), and mixtures of these salts. The separator 4 may be impregnated or wetted with the lithium salt electrolyte if it is liquid.

The anode 5 includes an active anode material. The active anode material may be selected from the group consisting of carbonaceous materials, silicon, silicon suboxide, silicon alloys, aluminum alloys, indium, indium alloys, tin, tin alloys, cobalt alloys and mixtures thereof. The active anode material is preferably selected from the group consisting of synthetic graphite, natural graphite, graphene, mesocarbon, doped carbon, hard carbon, soft carbon, fullerene, silicon-carbon composite, silicon, surface-coated silicon, silicon suboxide, silicon alloys, lithium, aluminum alloys, indium, tin alloys, cobalt alloys and mixtures thereof. In principle, further active anode materials known from the prior art are also suitable, for example including niobium pentoxide, titanium dioxide, titanates such as lithium titanate ($Li_4Ti_5O_{12}$), tin dioxide, lithium, lithium alloys and/or mixtures thereof.

Figure 2:
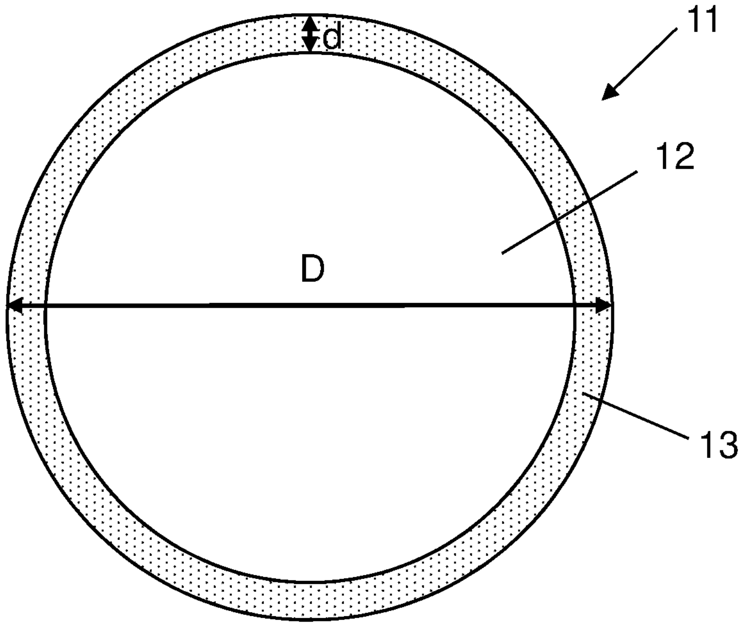

The cathode 2 in the lithium ion battery 10 has an active cathode material having a core-shell structure. The active cathode material has a multitude of particles 11. One particle 11 is shown schematically in FIG. 2. The particles 11 each have a core 12 and a shell 13. The diameter D of the particles 11 of the active cathode material, on average, is from 0.1 μm to 40 μm inclusive, preferably from 1 μm to 20 μm inclusive. The shell 13 of the particles 11, on average, has a thickness d in the range from 0.01 μm to 5 μm inclusive, preferably from 0.05 μm to 1 μm inclusive.

The material of the core 12 may be a layered oxide, for example NMC, NCA or LCO. The layered oxide may especially be an overlithiated layered oxide (OLO). Alternatively, the material of the core 12 may include a compound having spinel structure, for example LMO or LNMO, or a compound having olivine structure, for example LFP or LMFP. The material of the shell 13 is an olivine compound, preferably comprising an exclusively iron- and/or manganese-containing olivine (e.g., $Li_xFePO_4$ or $Li_xFe_yMn_{1-y}PO_4$ with $0 \le x \le 1$ and $0 \le y \le 1$). The material of the core 12 and/or the material of the shell 13 is at least partly delithiated.

The production of a lithium ion battery 10 with the active core-shell cathode material and an active anode material is elucidated hereinafter with reference to a reference example that does not have all the features of the invention, and with reference to a working example of the invention.

Table 1 lists the substances and materials used in the examples.

TABLE 1

Substances and materials used.

| | Description |
|---|---|
| NMC811 | $LiNi_{0.8}Mn_{0.1}Co_{0.1}O_2$ Core material of the active cathode material |
| $FePO_4$ | Iron phosphate having olivine structure, shell material of the active cathode material |
| PVdF | Polyvinylidene fluoride, binder |
| NMP (electronic grade) | N-Methyl-2-pyrrolidone, carrier solvent |
| Aluminum carrier foil | Carrier foil for cathode |
| Natural graphite | Active anode material |
| SBR | Styrene-butadiene rubber, binder |
| CMC | Carboxymethylcellulose, binder |
| Super C65 (conductive carbon black) | Conductivity additive |

TABLE 1-continued

| Substances and materials used. | |
|---|---|
| | Description |
| Copper carrier foil | Carrier foil for anode |
| Celgard 2500 separator | Separator (25 μm) of polypropylene (PP) |
| Liquid electrolyte, comprising a solution of $LiPF_6$ in organic carbonates (e.g. ethylene carbonate (EC), diethylene carbonate (DDC)) | Liquid electrolyte comprising conductive lithium salt |
| Aluminum composite foil | Packaging foil for the cell |

Example 1 (Reference Example)

A blend of 94% by weight of NMC811, 3% by weight of PVdF, and 3% by weight of conductive carbon black is suspended in NMP at 20° C. with a dissolver-mixer at high shear. This affords a homogeneous coating composition, which is knife-coated onto an aluminum carrier foil that has been rolled to 15 μm. Drawing off the NMP affords a composite cathode film having a weight per unit area of 21.3 mg/cm$^2$.

Analogously, an anode coating composition having a composition of 94% by weight of natural graphite, 2% by weight SBR, 2% by weight of CMC and 2% by weight of Super C65 is produced and applied to a 10 μm rolled copper carrier foil. The anode film thus produced has a weight per unit area of 12.7 mg/cm$^2$.

The cathode 2 with the cathode film, using an anode 5 with the anode film, a separator 4 (25 μm) of polypropylene (PP) and a liquid electrolyte 3 in the form of a 1 M solution of $LiPF_6$ in EC/DMC (3:7 w/w), is used to build a lithium ion battery 10 with active electrode area 25 cm$^2$, which is packed in highly processed aluminum composite foil (thickness 0.12 mm) and sealed. The result is a pouch cell having external dimensions of about 0.5 mm×6.4 mm×4.3 mm.

The lithium ion battery 10 is charged for the first time to 4.2 V (C/10) and then discharged at C/10 to 2.8 V. The capacity in the first charge is 111 mAh, and the capacity in the first discharge is 100 mAh. This results in a formation loss of about 10% for the complete lithium ion battery 10. This corresponds to an expected formation loss of about 10% when graphite is used as active anode material.

Example 2 (Lithium Ion Battery in a Working Example of the Invention)

A blend of 94% by weight of the disclosed active cathode material (consisting of an $FePO_4$ shell comprising ~5% by weight and an NMC811 core comprising 95% by weight), 3% by weight of PVdF, and 3% by weight of conductive carbon black is suspended in NMP at 20° C. with a mixing apparatus at high shear. The diameter of the core 12 of the particles 11 is about 5 μm, and the thickness of the shell 13 is about 0.06 μm. This affords a homogeneous coating composition, which is knife-coated onto an aluminum collector-carrier foil that has been rolled to 15 μm. Drawing off the NMP affords a composite cathode film having a weight per unit area of 22.4 mg/cm$^2$.

Alternatively, the active cathode material of the disclosure can be used to perform the electrode production in an aqueous medium with aqueous binders: a blend of 94% by weight of the inventive active cathode material (consisting of an $FePO_4$ shell comprising ~5% by weight and an NMC811 core comprising 95% by weight), 2% by weight of SPR, 1% by weight of CMC and 3% by weight of conductive carbon black is suspended in demineralized water at 20° C. with a mixing apparatus at high shear. The diameter of the core 12 of the particles 11 is about 5 μm, and the thickness of the shell is about 0.06 μm. This affords a homogeneous coating composition, which is knife-coated onto an aluminum collector-carrier foil that has been rolled to 15 μm. Drawing off the demineralized water affords a composite cathode film having a weight per unit area of 22.4 mg/cm$^2$.

Analogously, an anode coating composition having a composition of 94% by weight of natural graphite, 2% by weight of SPR, 2% by weight of CMC and 2% by weight of Super C65 is produced and applied to a 10 μm rolled copper carrier foil. The anode film thus produced has a weight per unit area of 12.7 mg/cm$^2$.

The cathode 2 with the cathode film, using an anode 5 with the anode film, a separator 4 (25 μm) and a liquid electrolyte 3 in the form of a 1 M solution of $LiPF_6$ in EC/DMC (3:7 w/w), is used to build a lithium ion battery 10 with active electrode area 25 cm$^2$, which is packed in aluminum composite foil (thickness 0.12 mm) and sealed. The result is a pouch cell having external dimensions of about 0.5 mm×6.4 mm×4.3 mm.

The lithium ion battery 10 is charged for the first time to 4.2 V (C/10) and then discharged at C/10 to 2.8 V. The capacity in the first charge is 111 mAh, and the capacity in the first C/10 discharge is 104.5 mAh.

Comparison of the Examples

The use of the active core-shell cathode material (example 2) in the cathode 2 leads to a higher nominal capacity of lithium ion battery 10 with respect to the reference example. The increase in weight per unit area of the cathode film in example 2 by comparison with the reference example (22.4 mg/cm$^2$ rather than 21.3 mg/cm$^2$) results from the $FePO_4$ particle shell 13; the proportion of cobalt and nickel, which are costly and available in finite volumes, is the same in the two examples. Alternatively, it may also be possible to keep the nominal capacity constant for the disclosed lithium ion battery 10, and instead to reduce the proportion of cobalt and nickel.

The lithium ion battery 10 is not limited to graphite as active anode material; it is advantageously also possible to use silicon-based active anode materials or other active anode materials.

Although the invention has been illustrated and described in detail with reference to working examples, the invention is not limited by the working examples. Instead, the person skilled in the art is able to derive other variations of the invention without leaving the scope of protection of the invention as defined by the claims.

LIST OF REFERENCE NUMERALS

1 current collector
2 cathode
3 electrolyte
4 separator
5 anode
6 current collector
10 lithium ion battery
11 particle
12 core
13 shell

The invention claimed is:

1. An active cathode material for a lithium ion battery, the active cathode material comprising:

particles having a core-shell structure, each of the particles having a core comprising a core material and a shell made of a shell material, wherein the core material comprises a layered oxide, the shell material consists of an olivine compound, the shell material and/or the core material is at least partly delithiated, the olivine compound is $Li_xFePO_4$ or $Li_xFe_yMn_{1-y}PO_4$ with $x \leq 0.9$ and $0 \leq y \leq 1$.

2. The active cathode material according to claim 1, wherein the particles have a diameter of from 0.1 μm to 40 μm inclusive.

3. The active cathode material according to claim 2, wherein the particles have a diameter of from 1 μm to 20 μm inclusive.

4. The active cathode material according to claim 1, wherein the shell has a thickness of from 0.01 μm to 5 μm inclusive.

5. The active cathode material according to claim 4, wherein the shell has a thickness of from 0.05 μm to 1 μm inclusive.

6. The active cathode material according to claim 1, wherein the core is fully lithiated.

7. A process for producing a cathode having an active cathode material according to claim 1, wherein the cathode is produced with at least one electrode binder and water as a carrier solvent.

8. A lithium ion battery comprising:

a cathode having an active cathode material according to claim 1.

9. The lithium ion battery according to claim 8, wherein the cathode contains at least one aqueously processible electrode binder.

10. The cathode active material according to claim 1, wherein $0.5 \leq x \leq 0.9$.

11. The cathode active material according to claim 1, wherein the layered oxide comprises lithium nickel manganese cobalt oxide (NMC), lithium nickel cobalt aluminum oxide (NCA), or lithium cobalt oxide (LCO).

12. The cathode active material according to claim 1, wherein the layered oxide comprises an overlithiated layered oxide.

* * * * *